(12) United States Patent
Kumar et al.

(10) Patent No.: US 8,739,259 B1
(45) Date of Patent: May 27, 2014

(54) MULTILAYER WIRELESS MOBILE COMMUNICATION DEVICE AUTHENTICATION

(75) Inventors: Anil Kumar, Spotswood, NJ (US); Sukumar Thiagarajah, Laurence Harbour, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/084,257

(22) Filed: Apr. 11, 2011

(51) Int. Cl.
*H04L 29/06* (2006.01)
(52) U.S. Cl.
USPC .............................................. 726/7
(58) Field of Classification Search
USPC .............................................. 726/7
See application file for complete search history.

(56) References Cited

U.S. PATENT DOCUMENTS

2003/0096595 A1* 5/2003 Green et al. .................. 455/411
2008/0010673 A1* 1/2008 Makino et al. .................... 726/6
2010/0223468 A1* 9/2010 Sun ............................... 713/168

* cited by examiner

*Primary Examiner* — Jason Gee

(57) ABSTRACT

A multilayer security approach may be used by a server computer system which sequentially sends one or more security codes back to a client computer system which is identified at the beginning of an authentication process. The server computer system may be an email server and the client computer system may be wireless mobile communication device. Each subsequent request for service from the client computer system to the server computer system may be required to include one of these security codes for the request to be authenticated.

21 Claims, 4 Drawing Sheets

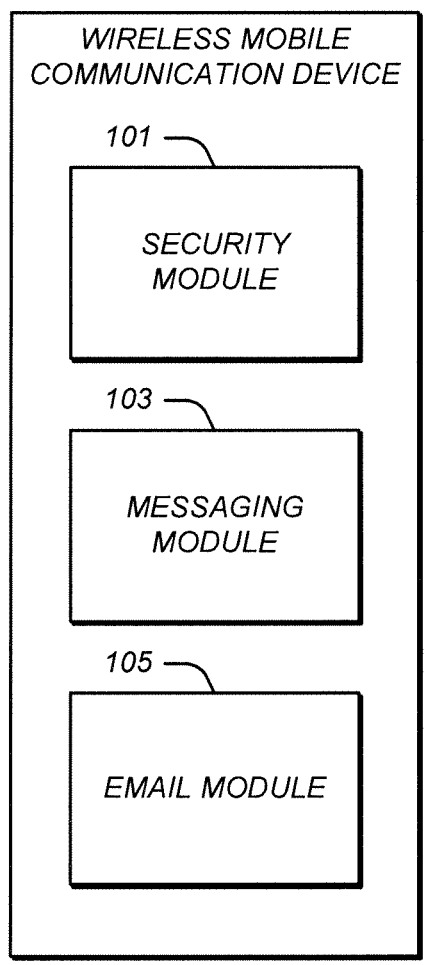
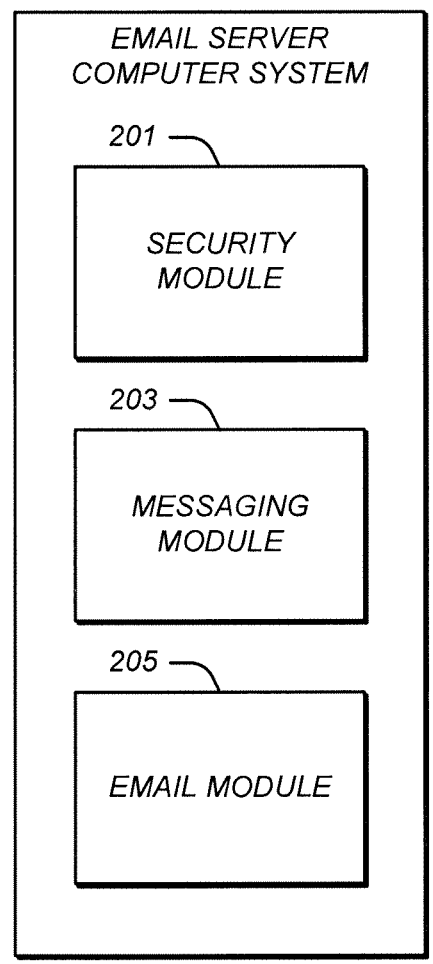
FIG. 1
FIG. 2

MULTILAYER WIRELESS MOBILE COMMUNICATION DEVICE AUTHENTICATION

BACKGROUND

1. Technical Field

This disclosure relates to secured communications between computers, including the secured delivery of messages to wireless mobile communication devices.

2. Description of Related Art

Wireless mobile communication devices are often authenticated with a combination of Information in subscriber identification module (SIM) cards within the device and personal identification numbers (PINs). This approach, however, can cause authentication to be dependent upon the device, making changes in a device (such as changing the mobile device number (MDN) from one device to another) cumbersome. It may also not adequately prevent access to secured information in the event the device is stolen, until the device gets deactivated. The approach may also be challenging to scale to multiple mobile platforms.

Efforts are being made to centralize the task of gathering messages (including emails) for wireless mobile communication devices from multiple sources. The need for better messaging security may be particularly great here, as queries to the central messaging-gathering system may be able to be sent by anyone over the Internet and because of the sensitivity of the comprehensive messaging information which it gathers and stores. Accessing the central messaging gathering system should require authentication in a secured way.

Better authentication and security are therefore needed.

SUMMARY

A multilayer security approach may be used by a messaging server computer system that sequentially sends one or more security codes back to a client computer system identified at the beginning of an authentication process. The server computer system may be any type of messaging server, such as an email server and the client computer system may be wireless mobile communication device. Each subsequent request for service from the client computer system to the server computer system may be required to include one of these security codes for the request to be authenticated.

The client computer system may include a client security module that authenticates the client computer system to a server computer system. The security module may send an identification (ID) communication to the server computer system that contains information identifying the client computer system. In response to the ID communication, the security module may receive a test security code sent by the server computer system via a different channel than the request channel. This allows the server system to ensure that the test security code will be received by the client sending the original request. In response to receiving the test security code and without user input after the test security code is received, the security module may send a verification communication to the server computer system that contains information identifying the client computer system and the test security code. A client service module within the client computer system may provide a service related to the server computer system.

The client computer system may be a wireless mobile communication device having a mobile device number (MDN). The information identifying the client computer system may include the MDN.

The client computer system may include a client messaging module that receives messages, including the test security code as part of a test message from the server computer system. The test message may be an SMS message. The client security module may extract the test security code from the test message. The client security module may cause the client messaging module to delete the test message after extracting the test security code from the test message.

In response to sending the verification communication, the client security module may receive an authorization security code from the server computer system and cause the authorization security code to be stored.

The client computer system may include a client messaging module configured to receive messages and to receive the authorization security code as part of an authorization message from the server computer system. The client security module may extract the authorization security code from the authorization message. The client security module may cause the client messaging module to delete the authorization message after extracting the authorization security code from it.

The service module may send a service request communication to the server computer system requesting a service from the server computer system. The service request communication may contain information identifying the client computer system and the authorization security code.

The client service module may include a client email module configured to receive and store emails. The service request communication may request emails from the server computer system. The client email module may receive and store emails sent by the server computer system in response to the service request communication.

The server computer system may include a server security module configured to authenticate service request communications from a client computer system. The server security module may receive a communication from the client computer system that contains information identifying the client computer system.

In response to the communication, the server security module may send an authorization security code to the client computer system identified by the information identifying the client computer system.

The server security module may receive a service request communication from the client computer system that requests a service from the server computer system and that includes information identifying the client computer system and an authorization security code. The server security module may authorize a server service module to provide the requested service to the client computer system if and only if the authorization security code in the service request communication matches the authorization security code sent to the client computer system. The server service module may provide the requested service to the client computer system if and only if authorized to do so by the server security module.

The server computer system may include a server messaging module that sends the authorization security code as part of an authorization message to the client computer system.

The communication from the client computer system may be a verification communication that also contains a test security code. The server security module may receive an identification communication from the client computer system before the verification communication that contains information identifying the client computer system. In response to the identification communication, the server security module may send the test security code to the client computer system identified by the information identifying in the identification communication. The server security module may receive the test security code as part of the verification communication. The server security module may send the authorization security code to the client computer system if and only if the test security code that is part of the verification communication matches the test security code that was sent.

The server computer system may include a server messaging module configured to send the test security code as part of test message to the client computer system identified in the identification communication.

The server service module may include a server email module configured to send emails. The service request communication may request emails from the server email module. The server email module may provide the requested emails if and only if permitted to do so by the server security module.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 1 illustrates an example of a wireless mobile communication device.

FIG. 2 illustrates an example of an email server computer system.

DETAILED DESCRIPTION OF ILLUSTRATIVE EMBODIMENTS

Figure 3:
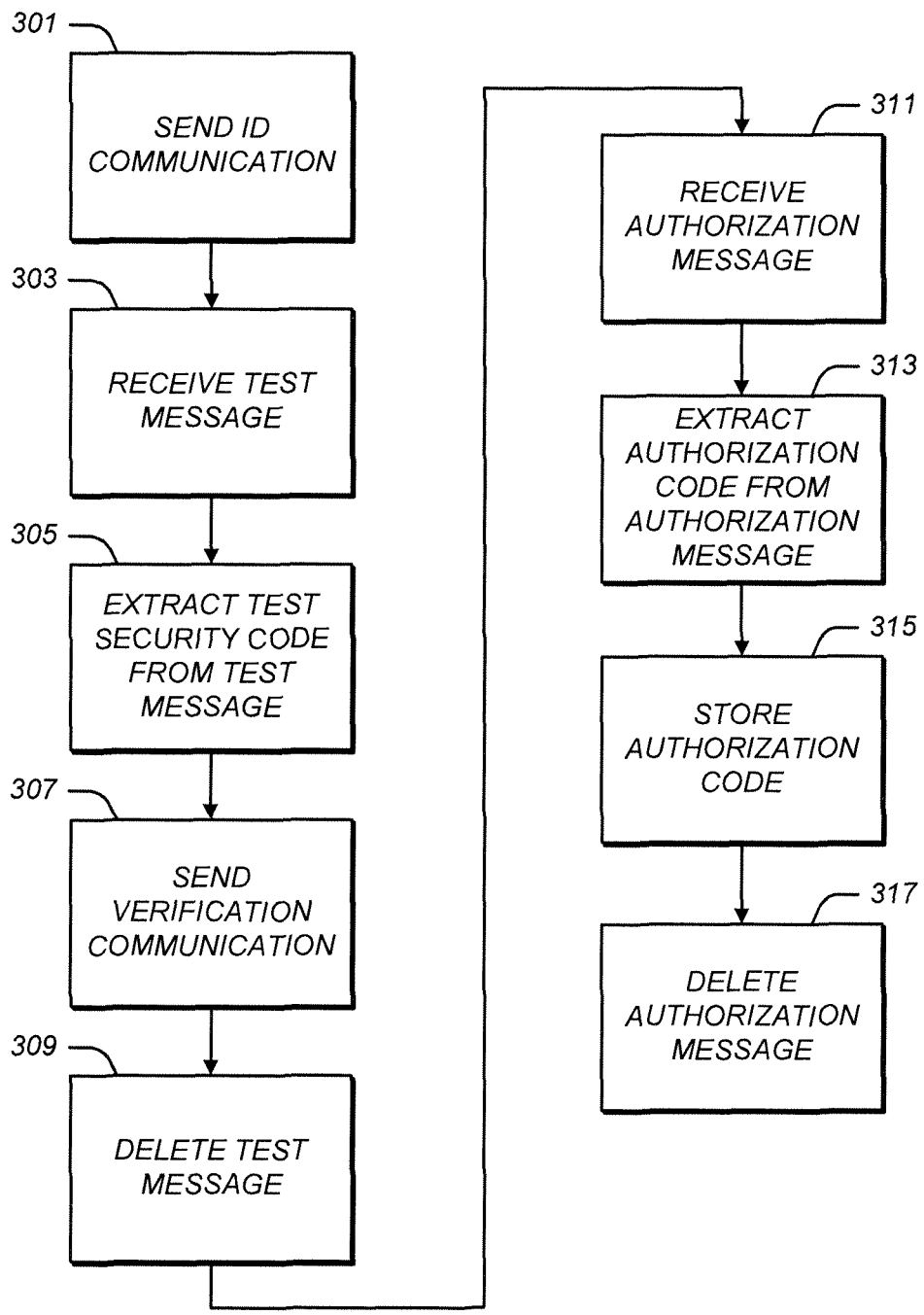
FIG. 3 illustrates an example of an authentication process which the wireless mobile communication device illustrated in FIG. 1 implements.

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

FIG. 1 illustrates an example of a wireless mobile communication device. The wireless mobile communication device is configured to communicate wirelessly over any type of network, such as over a cellular telephone network and/or the Internet.

The wireless mobile communication device may be of any type. For example, the wireless mobile communication device may be a smart phone, tablet, or laptop computer.

The wireless mobile communication device includes various modules, such as a security module 101, a messaging module 103, and an email module 105. Functions which these modules perform are described below.

FIG. 2 illustrates an example of a messaging server system, in particular an email server computer system. The email server computer system is configured to communicate over a computer network, such as over a cellular telephone network and/or the Internet, with various wireless mobile communication devices, such as the wireless mobile communication device illustrated in FIG. 1, and with various email service providers. The email server computer system includes various modules, including a security module 201, a messaging module 203, and an email module 205. Functions performed by these modules are described below.

Figure 4:
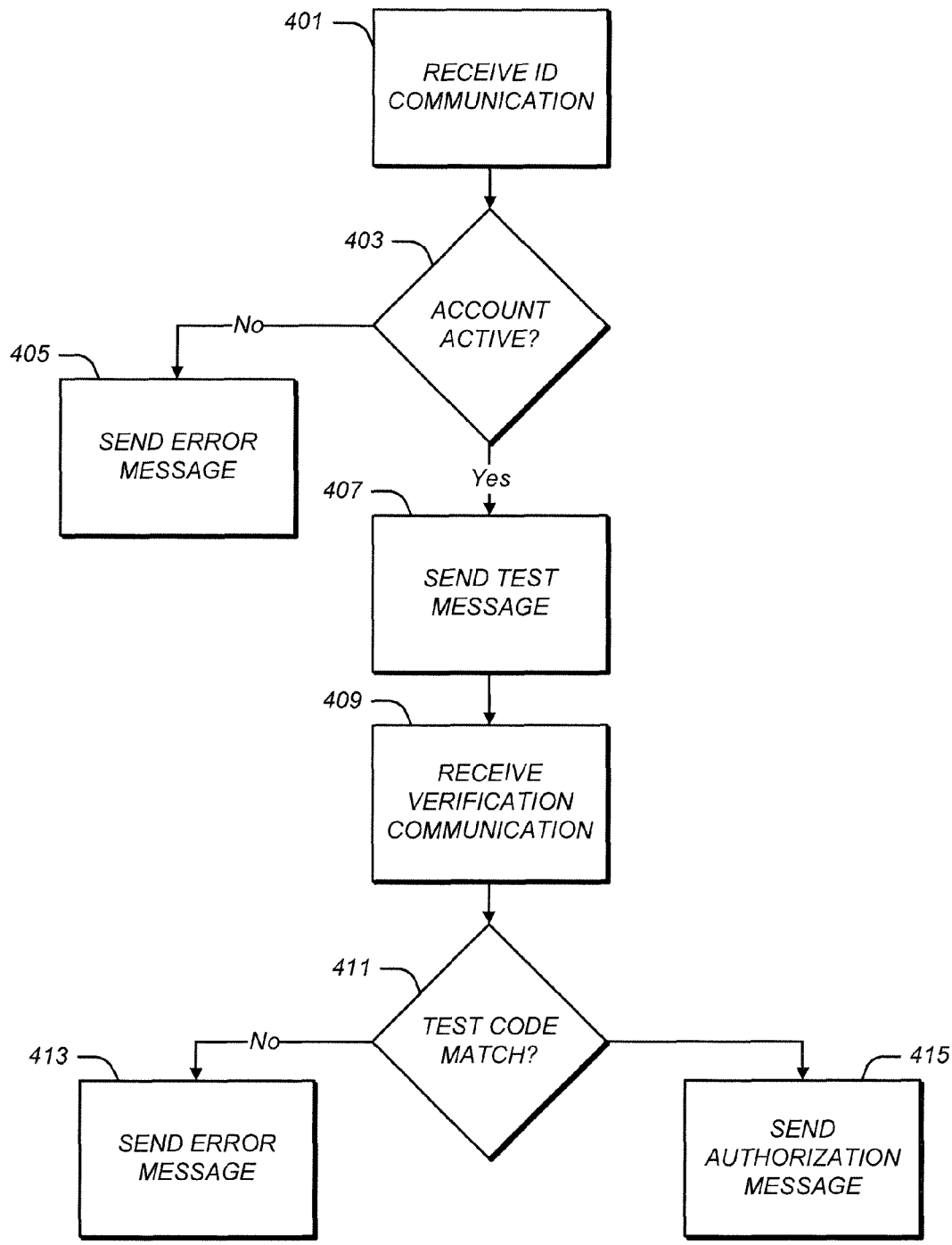
FIG. 4 illustrates an example of a corresponding authentication process which the email server computer system illustrated in FIG. 2 implements.

FIG. 3 illustrates an example of an authentication process which the wireless mobile communication device illustrated in FIG. 1 implements. FIG. 4 illustrates an example of a corresponding authentication process which the email server computer system illustrated in FIG. 2 implements. A description of these processes, as well as the modules in FIG. 1 or FIG. 2 which perform them, is now provided.

The security module 201 is configured to authenticate service request communications seeking services from the email server computer system from wireless mobile communication devices, such as the wireless mobile communication device illustrated in FIG. 1. Correspondingly, the security module 101 in the wireless mobile communication device is configured to authenticate the wireless mobile communication device to the email server computer system in a cooperative effort. Examples of authentication approaches are now discussed.

The security module 101 is configured to send an identification (ID) communication to the email server computer system, as reflected by a Send ID Communication step 301. The ID communication contains information identifying the wireless mobile communication device, which is unique to the wireless mobile communication device. When the wireless mobile communication device has a mobile device number (MDN), for example, the information identifying the computer system may be the MDN.

The security module 201 receives the identification communication from the wireless mobile communication device, as reflected by a Receive ID Communication step 401. The security module 201 then determines whether the wireless mobile communication device, which is identified through the information in the communication, is one which is authorized to receive services from the email server computer system. For example, the security module 201 may check to determine whether the wireless mobile communication device currently has an active account with a cellular service that is associated with the email server computing system. This active status, for example, may be based on whether an account has been created and whether required payments on that account have been made.

If the security module 201 determines that the wireless mobile communication device is not authorized to receive the services of the email server computer system, an error message to this effect is returned to the wireless mobile communication device, as indicated by a Send Error Message step 405.

On the other hand, if the wireless mobile communication device is authorized to receive the services of the email server computer system, the security module 201 generates or otherwise obtains a unique test security code, which may be an encrypted random number, such as a six digit number, and sends this test security code back to the wireless mobile communication device.

The security module 201 calls upon a messaging module 203 within the email server computer system to send this test security code. The messaging module 203, in turn, sends this test security code (e.g., an encrypted PIN) as part of a test message to the wireless mobile communication device which is identified in the ID communication, as reflected by a Send Test Message step 407. This test security code may be appended to a predefined prefix, so that the device can handle this message separately from other messages. The messaging module 203 may utilize any messaging format, such as SMS. The security module 201 may encrypt the test security code before delivery. Any protocol or standard may be used for encryption. In addition, the test security code is stored in the server system and is associated with the requesting device, which ensures that only the requesting device can later use the test security code in responding to the test message.

The test message is received by the messaging module 103 in the wireless mobile communication device. The security module 101 in the wireless mobile communication device automatically detects the receipt of an incoming text message, as reflected by a Received Test Message step 303, without the necessity for any intervening user input. The security module 101 is configured to automatically extract the test security code from the test message, as reflected by an Extract Test Security Code From Text Message step 305, again without the necessity for any intervening user input. The test security code may be decrypted when needed.

The security module 101 then sends a verification communication to the email server computer system in response, as reflected by a Send Verification Communication step 307, again without the necessity for any intervening user input. The verification communication includes information identifying the wireless mobile communication device, such as its MDN, and the test security code. Software loaded on the wireless mobile communication device intercepts the test message, extracts the test security code and responds with the verification communication. The test security code and/or the information identifying the wireless mobile communication device may be encrypted. Again, any protocol or standard may be used for encryption.

The security module 101 may then optionally direct the messaging module 103 to delete the text message, as reflected by a Delete Test Message step 309, again without any intervening user input.

The steps of receiving the test message, extracting the test security code from it, decrypting the code (when needed), sending back the information identifying the wireless mobile communication device and the test security code (optionally encrypted), and then optionally deleting the test message may all take place without any intervening user input and, optionally, without any notice to the user of what is or has taken place. The software loaded on the wireless mobile communication device is triggered when initiating a new email/message account connection to automatically request the test security code, intercept the response on arrival, extract the test security code from the response, reply using the test security code, and delete the message, all without the user being aware of this process. In an alternate configuration, user approval may be required and/or notice may be provided to the user at one or more steps along the way. The mobile device may be configured to automatically act on a message that is appended to the pre-defined prefix, as discussed above.

The security module 201 in the email server computer system, in turn, is configured to receive the verification communication, as reflected by a Receive Verification Communication step 409. The security module 201 extracts the information identifying the wireless mobile communication device and the test security code (decrypting the information as needed). The security module 201 then determines whether the test security code in the verification communication matches the test security code which was sent to the wireless mobile communication device, as reflected by a Test Code Match? decision step 411. If the codes do not match, the security module 201 may cause an error message to be sent to the wireless mobile communication device, as reflected by a Send Error Message step 413.

On the other hand, if the test security codes do match, the security module 201 is configured to cause the messaging module 203 to send a unique authorization security code to the wireless mobile communication device identified in the verification communication as part of an authorization message, as reflected by a Send Authorization Message step 415. The authorization message may be sent in any format, such as in SMS, and the authorization security code may be encrypted. During this step, the security module 201 generates or otherwise obtains the unique authorization security code. The security module 201 also stores the assigned authorization security code in association with the wireless mobile communication device identified in the verification communication.

The messaging module 103 in the wireless mobile communication device receives the authorization message, as reflected by a Receive Authorization Message step 311. Just like the test message, the security module 101 in the wireless mobile communication device automatically detects the receipt of the authorization message and automatically extracts the authorization code from it, as reflected by an Extract Authorization Code From Authorization Message step 313. The authorization security code may be decrypted, as needed. The security module 101 then stores the authorization security code, as reflected by a Store Authorization Security Code 315. The code may be encrypted prior to storage. The security module 101 may then optionally direct the messaging module 103 to delete the authorization message, as reflected by a Delete Authorization Message step 317. Again, the security module 101 may perform the detection, extraction, storage, and deletion steps automatically, all without any intervening user input, or without any notice to the user. In an alternate configuration, user approval may be required and/or notice may be provided to the user at one or more steps along the way.

The processes which have just been described, when implemented without a detected error, result in the wireless mobile communication device being authenticated by the email server computer system. Both the wireless mobile communication device and the email server computer system now contain a record of the authorization security code which the email server computer system assigned to the wireless mobile communication device.

Figure 5:
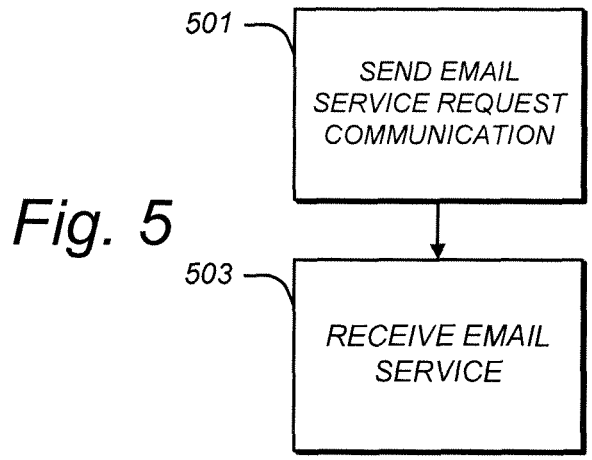
FIG. 5 illustrates an example of a service request process which the wireless mobile communication device illustrated in FIG. 1 implements.
Figure 6:
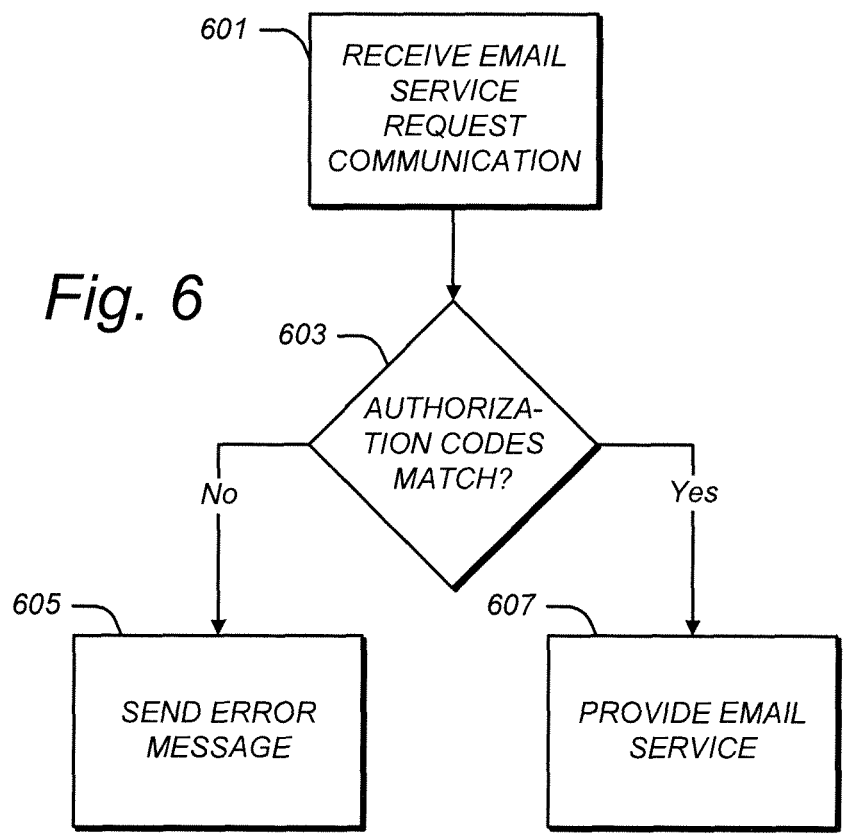
FIG. 6 illustrates an example of a corresponding service request process which the email server computer system illustrated in FIG. 2 implements.

FIG. 5 illustrates an example of a service request process which the wireless mobile communication device illustrated in FIG. 1 implements. FIG. 6 illustrates an example of a corresponding service request process which the email server computer system illustrated in FIG. 2 implements.

The email module 105 in the wireless mobile communication device may request email services from the email server computer system. Each service may be obtained by the email module 105 sending an email service request communication to the email server computer system, as reflected by a Send Email Service Request Communication step 501. The email service request communication may request any type of service from the email server computer system. For example, an email service request may request the downloading of one or more emails, the deletion of one or more emails, a search of stored emails.

The email server computer system may be an Internet service provider that maintains an email server on behalf of the user of the wireless mobile communication device. It may in addition or instead query one or more other email servers which maintain such email accounts and aggregate the results of the query. When the email server computer system aggregates emails from other email servers, the email service request communication may identify such other email accounts and/or provide information needed for access to these other email accounts, such as a user name and password for each account and/or any other or different information that needs to obtain access to these emails. Individual authorization takes place when aggregating user mail boxes. For example, if a user wants to aggregate two ISP's email, the user provides the username/password for both accounts one by one in a setup wizard. In addition to a user/password, the device provides the security token obtained earlier to add these accounts on a central server aggregating the email accounts.

Each email service request communication which is sent by the email module 105 includes information identifying the wireless mobile communication device, such as its MDN, and its authorization security code which was previously sent and stored. All or parts of this information may be encrypted before being sent. Each email service request communication also includes information indicative of the email service which is being requested.

The security module 201 in the email server computer system receives the email service request communication, as reflected by a Receive Email Service Request Communication step 601. The security module 201 extracts the information identifying the wireless mobile communication device and the authorization security code from the service request communication, decrypting the information as needed. The security module 201 then compares the extracted authorization security code with the authorization security code that was previously provided for the identified wireless mobile communication device, as reflected by an Authorization Codes Match? decision step 603. The security module 201 performs this operation by accessing the authorization security code which it previously sent to the identified wireless mobile communication device from a memory. If the codes do not match, the security module 201 may refuse to allow the email server computer system to provide the requested email service and may instead send an error message back to the wireless mobile communication device, as reflected by a Send Error Message step 605.

If the authorization security codes do match, on the other hand, the email security module 201 authorizes the email module 205 to provide the requested email service, as reflected by a Provide Email Service step 207, as reflected by a Receive Email Service step 503. The email module 205 then provides the service which has been requested. If the email service request communication requests that new aggregated emails be downloaded, for example, the email module 205 will deliver these emails to the email module 105 in the wireless mobile communication device. When the email service requests communication requests that emails be deleted from the email server computer system, the response may indicate whether or not the request was successful. The wireless mobile communication device may display a matching message.

The authorization security code in the wireless mobile communication device may be lost or expire due to a variety of reasons. For example, if radio connectivity is lost before the authorization security code is received by the wireless mobile communication device, the wireless mobile communication device will be unable to verify the authorization. For security reasons, the wireless mobile communication device may be given a limited amount of time to verify with the server before the test security code expires (e.g., 24 hours after generation). Similarly, the wireless mobile communication device may be required to periodically re-verify. In another example, a user may manually reset the device (e.g., to factory default) to clean up the data in device, or to terminate a service, which clears the verification. The user may, in addition or instead, move his SIM card from one device to another on LTE devices. The user may also purchase a different wireless mobile communication device and configure it to use the same MDN. In these instances, the authentication processes illustrated in FIGS. 3 and 4 may be repeated in connection with the reset or new device. The security module 101 and/or 201 may also be configured to provide a user with an option to request a new authorization security code, following which the authentication processes illustrated in FIGS. 3 and 4 may also be repeated.

Although having thus far described certain security features in connection with a wireless mobile communication device and an email server computing system, these security features may be used in connection with other types of computers which communicate with one another. For example, these security features may be used in connection with any type of client computing system and associated server computing system.

Similarly, although messaging modules have thus-far been described as being used to exchange security information between the client and server computing systems, other types of modules may be used instead, such as a billing module and/or usage module.

Similarly, although email services have thus-far been described as being the subject of service request communications, the service request communications may seek other types of services, such as MMS and/or VVM.

Similarly, although multiple levels security procedures have been described, a lesser number of levels may be used instead. For example, the security module 201 in the email server computer system may be configured to return the authorization security code to the wireless mobile communication device identified in the ID communication, without requiring any intervening test message to be sent or its accompanying test security code to be returned. The number of security levels may be dependent upon the type of email account. For example, a personal email account may utilize more or less security levels than a corporate email account.

Unless otherwise indicated, the client computer system, the wireless mobile communication device, the server computer system, the email server computer system, and each of the security modules, messaging modules, and email modules, are each implemented with a computer system configured to perform the functions which have been described herein for the component.

Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each computer system may include software (e.g., one or more operating systems, device drivers, module programs, and/or communication programs), which may be configured when executed to cause the computer system to perform one or more of the functions which have been described herein for the computer system, such as the functions which have been described herein for the various security modules, messaging modules, and email modules. The software may include programming instructions and associated data and libraries. In this instance, each function which is described herein is also descriptive of an algorithm with the software causes the computer system to perform. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory. Each computer system for the server computer system, including the email server computer system, may include one or more computers at the same or different locations. When at different locations, the computers may be configured to communicate with one another through a wired and/or wireless network communication system.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the security system and methods that have been described have usually been in connection requests for email services. However, the same systems and methods may be used in connection with requests for other services, such as for services in connection with messages other than email.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent modules, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A client computer system comprising:
a processor configured to control operations of the client computer system;
a memory;
a client security module program in the memory to authenticate the client computer system to a server computer system; and
a client service module program in the memory to provide a service related to the server computer system, wherein:
the client computer system is a wireless mobile communication device having a mobile device number (MDN);
execution of the client security module program by the processor configures the client computer system to implement functions, including functions to:
send to the server computer system an identification (ID) communication that contains information identifying the client computer system including the MDN;
in response to the ID communication, receive a test security code sent by the server computer system; and
in response to receiving the test security code and without user input after the test security code is received, send to the server computer system a verification communication that contains information identifying the client computer system including the MDN and the test security code;
in response to sending the verification communication, receive an authorization security code from the server computer system; and
cause the authorization security code to be stored in the memory; and
execution of the client service module program by the processor further configures the client computer system to implement further functions, including functions to:
send a service request communication to the server computer system requesting a service from the server computer system,
wherein the client service request communication contains information identifying the client computer system including the MDN, information identifying the service related to the server computer system, and the authorization security code.

2. The client computer system of claim 1, further comprising:
a client messaging module program in the memory, wherein:
execution of the client messaging module program by the processor further configures the client computer system to implement further functions, including functions to receive messages, including the test security code as part of a test message from the server computer system; and
further execution of the client security module program by the processor further configures the client computer system to implement further functions, including functions to extract the test security code from the test message.

3. The client computer system of 2 wherein the test message is an SMS message.

4. The client computer system of claim 2 wherein further execution of the client security module program by the processor further configures the client computer system to implement further functions, including functions to cause the client messaging module to delete the test message after extracting the test security code from the test message without any intervening user input.

5. The client computer system of claim 1, further comprising:
- a client messaging module program in the memory, wherein:
  - execution of the client messaging module program by the processor further configures the client computer system to implement further functions, including functions to receive messages and to receive the authorization security code as part of an authorization message from the server computer system; and
  - further execution of the client security module program by the processor further configures the client computer system to implement further functions, including functions to extract the authorization security code from the authorization message.

6. The client computer system of 5 wherein the authorization message is an SMS message.

7. The client computer system of claim 5 wherein further execution of the client security module program by the processor further configures the client computer system to implement further functions, including functions to cause the client messaging module to delete the authorization message after extracting the authorization security code from the authorization message without any intervening user input.

8. The client computer system of claim 1, further comprising a client service messaging module program in the memory, wherein:
- execution of the client service messaging module program by the processor further configures the client computer system to implement further functions, including functions to receive and store messages sent by the server computer system in response to the service request communication.

9. The client computer system of claim 1 wherein the client security module is configured to only receive the test security code in response to the ID communication.

10. The client computer system of claim 1 wherein the client security module is configured to receive the test security code and to send the verification communication without causing notice of either action to be communicated to the user.

11. A server computer system comprising:
- a processor configured to control operations of the server computer system;
- a memory;
- a server security module program in the memory to authenticate service request communications from a client computer system; and
- a server service module program in the memory, wherein:
  - the client computer system is a wireless mobile communication device having a mobile device number (MDN);
  - execution of the server security module program by the processor configures the server computer system to implement functions, including functions to:
    - receive from the client computer system a communication that contains information identifying the client computer system including the MDN;
    - in response to the communication, send a first authorization security code to the client computer system identified by the information identifying the client computer system;
    - receive a service request communication from the client computer system that requests a service from the server computer system and that includes information identifying the client computer system including the MDN and a second authorization security code; and
    - authorize the server service module program to provide the requested service to the client computer system if and only if the second authorization security code in the service request communication matches the first authorization security code sent to the client computer system; and
  - execution of the server service module program by the processor further configures the server computer system to implement further functions, including functions to:
    - provide the requested service to the client computer system if and only if authorized to do so by the server security module program.

12. The server computer system of claim 11, further comprising a server messaging module program in the memory, wherein:
- execution of the server messaging module program by the processor further configures the server computer system to implement functions, including functions to:
  - send the authorization security code as part of an authorization message to the client computer system.

13. The server computer system of claim 12 wherein the authorization message is an SMS message.

14. The server computer system of claim 11 wherein:
- the communication that contains information identifying the client computer system is a verification communication that also contains a first test security code; and
- further execution of the server security module program by the processor further configures the server computer system to implement functions, including functions to:
  - receive, from the client computer system before the verification communication, an identification communication that contains information identifying the client computer system including the MDN;
  - in response to the identification communication, send a second test security code to the client computer system identified by the information identifying the client computer system including the MDN in the identification communication;
  - receive the first test security code as part of the verification communication; and
  - send the first authorization security code to the client computer system if and only if the first test security code that is part of the verification communication matches the second test security code that was sent.

15. The server computer system of claim 14, further comprising a server messaging module program in the memory, wherein:
- execution of the server messaging module program by the processor further configures the server computer system to implement functions, including functions to:
  - send the first test security code as part of a test message to the client computer system identified in the identification communication.

16. The server computer system of claim 15 wherein the test message is an SMS message.

17. The server computer system of claim 14, further comprising a server messaging module program in the memory, wherein:

execution of the server messaging module program by the processor further configures the server computer system to implement functions, including functions to send messages in response to the service request communication if and only if permitted to do so by the server security module program.

18. The server computer system of claim 14 wherein further execution of the server security module program by the processor further configures the server computer system to implement functions, including functions to only send the second test security code in response to the identification communication.

19. The server computer system of claim 14 wherein further execution of the server security module program by the processor further configures the server computer system to implement functions, including functions to send the second test security code and to send the verification communication without causing notice of either action to be communicated to the user.

20. Non-transitory, tangible, computer-readable media containing:

a first program of computer-readable instructions configured to cause a client security module within a client computer system to:
send an identification (ID) communication to a server computer system that contains information identifying the client computer system including a mobile device number (MDN);
in response to the ID communication, receive a test security code sent by the server computer system;
in response to receiving the test security code and without user input after the test security code is received, send a verification communication to the server computer system that contains information identifying the client computer system including the MDN and the test security code;
in response to sending the verification communication, receive an authorization security code from the server computer system; and
cause the authorization security code to be stored; and a second program of computer-readable instructions configured to cause a client service module within the client computer system to:
send a service request communication to the server computer system requesting a service from the server computer system,
wherein the client service request communication contains information identifying the client computer system including the MDN, information identifying the service related to the server computer system, and the authorization code.

21. A system, comprising:

a client computer system comprising:
a processor configured to control operations of the client computer system;
a memory;
a client security module program in the memory of the client computer system to authenticate the client computer system to a server computer system; and
a client service module program in the memory of the client computer system to provide a service related to the server computer system, wherein:
the client computer system is a wireless mobile communication device having a mobile device number (MDN);
execution of the client security module program by the processor of the client computer system configures the client computer system to implement functions, including functions to:
send to the server computer system an identification (ID) communication that contains information identifying the client computer system including the MDN;
in response to the ID communication, receive a test security code sent by the server computer system;
in response to receiving the test security code and without user input after the test security code is received, send to the server computer system a verification communication that contains information identifying the client computer system including the MDN and the test security code;
in response to sending the verification communication, receive an authorization security code from the server computer system; and
cause the received authorization security code to be stored; and
execution of the client service module program by the processor of the client computer system further configures the client computer system to implement further functions, including functions to:
send a service request communication to the server computer system requesting a service from the server computer system,
wherein the client service request communication contains information identifying the client computer system including the MDN, information identifying the service related to the server computer system, and the received authorization security code; and the server computer system, comprising:
a processor configured to control operations of the server computer system;
a memory;
a server security module program in the memory of the server computer system to authenticate service request communications from the client computer system; and
a server service module program in the memory of the server computer system, wherein:
execution of the server security module program by the processor of the server computer system configures the server computer system to implement functions, including functions to:
receive from the client computer system the ID communication that contains information identifying the client computer system including the MDN;
in response to the communication, send a first code as the authorization security code to the client computer system identified by the information identifying the client computer system;
receive a service request communication from the client computer system that requests a service from the server computer system and that includes information identifying the client computer system and a second code; and
authorize the server service module program to provide the requested service to the client computer system if and only if the second code in the received service request communication matches the first code sent to the client computer system; and execution of the server service module program by the processor of the server computer system further configures the server computer system to implement further functions, including functions to:

provide the requested service to the client computer system if and only if authorized to do so by the server security module program.

* * * * *

UNITED STATES PATENT AND TRADEMARK OFFICE
CERTIFICATE OF CORRECTION

PATENT NO. : 8,739,259 B1
APPLICATION NO. : 13/084257
DATED : May 27, 2014
INVENTOR(S) : Kumar et al.

Page 1 of 1

It is certified that error appears in the above-identified patent and that said Letters Patent is hereby corrected as shown below:

Title Page, Item (75) Inventors should read:

--(75) Inventors: Anil Kumar, Spotswood, NJ (US);
Sukumar Thiagarajah, Laurence Harbour, NJ (US)--.

Signed and Sealed this
Twenty-third Day of June, 2015

Michelle K. Lee
*Director of the United States Patent and Trademark Office*